(12) United States Patent
Kubo

(10) Patent No.: US 7,149,904 B2
(45) Date of Patent: Dec. 12, 2006

(54) SYSTEM AND METHOD FOR PROVIDING A POWER CONTROL DEVICE FOR A COMPUTING UNIT

(75) Inventor: Toshihiro Kubo, Saitama (JP)

(73) Assignee: Seiko Epson Corporation, Tokyo (JP)

( * ) Notice: Subject to any disclaimer, the term of this patent is extended or adjusted under 35 U.S.C. 154(b) by 566 days.

(21) Appl. No.: 10/386,481

(22) Filed: Mar. 13, 2003

(65) Prior Publication Data
US 2003/0221136 A1 Nov. 27, 2003

(30) Foreign Application Priority Data
Mar. 20, 2002 (JP) .............................. 2002-079522

(51) Int. Cl.
*G06F 1/32* (2006.01)
(52) U.S. Cl. ....................... 713/300; 713/320
(58) Field of Classification Search ..................... None
See application file for complete search history.

(56) References Cited
U.S. PATENT DOCUMENTS 5,675,385 A * 10/1997 Sugiyama ................ 375/240.2
5,765,212 A    6/1998  Yamada
5,850,553 A * 12/1998  Schlansker et al. ......... 717/155
6,049,882 A *  4/2000  Paver .......................... 713/322
6,345,334 B1    2/2002  Nakagawa et al.
6,513,123 B1 *  1/2003  Muraki et al. ............... 713/320
6,694,442 B1 *  2/2004  Yeh ............................ 713/322
6,888,848 B1 *  5/2005  Beshai et al. ............... 370/474

FOREIGN PATENT DOCUMENTS

| EP | 0 913 828 A2 | 5/1999 |
| JP | A-8-23514 | 1/1996 |
| JP | A 09-319453 | 12/1997 |
| JP | A 2003-006179 | 1/2003 |

\* cited by examiner

*Primary Examiner*—James K. Trujillo
*Assistant Examiner*—Anand B. Patel
(74) *Attorney, Agent, or Firm*—Oliff & Berridge, PLC

(57) ABSTRACT

The invention provides a power control device for a computing unit, which is optimal for saving power. When MPEG data is supplied, a CPU starts decoding the MPEG data. The MPEG data is decoded by independently decoding video data and music data. When decoding the MPEG data, in each operation unit included in the MPEG data, the clock frequency of the CPU can be adjusted so as to reduce the power consumption of the CPU on the basis of the data length of the operation unit for a period during which the CPU performs an operation on the data in the operation unit.

8 Claims, 5 Drawing Sheets

[FIG. 1]
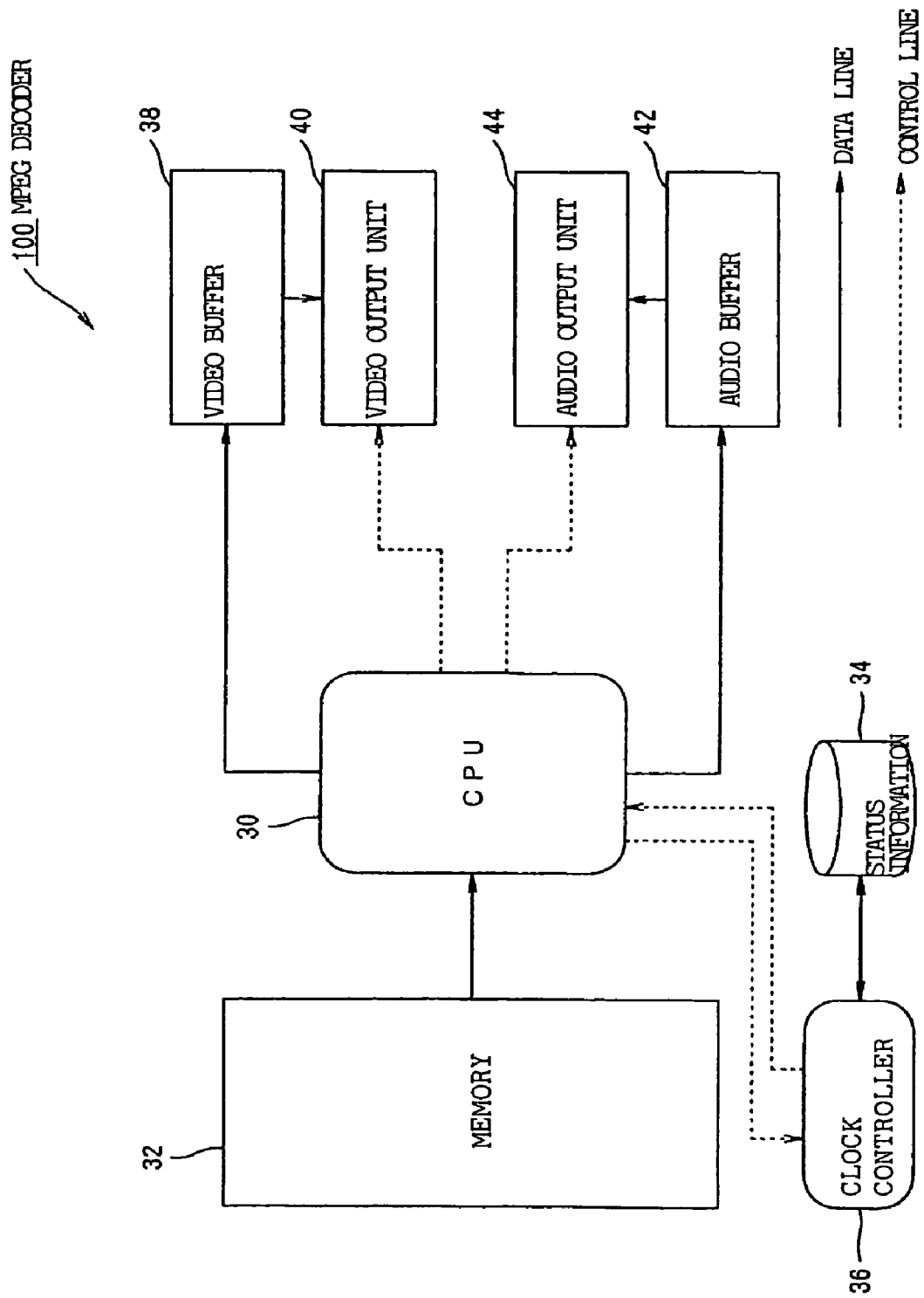

[FIG. 2]
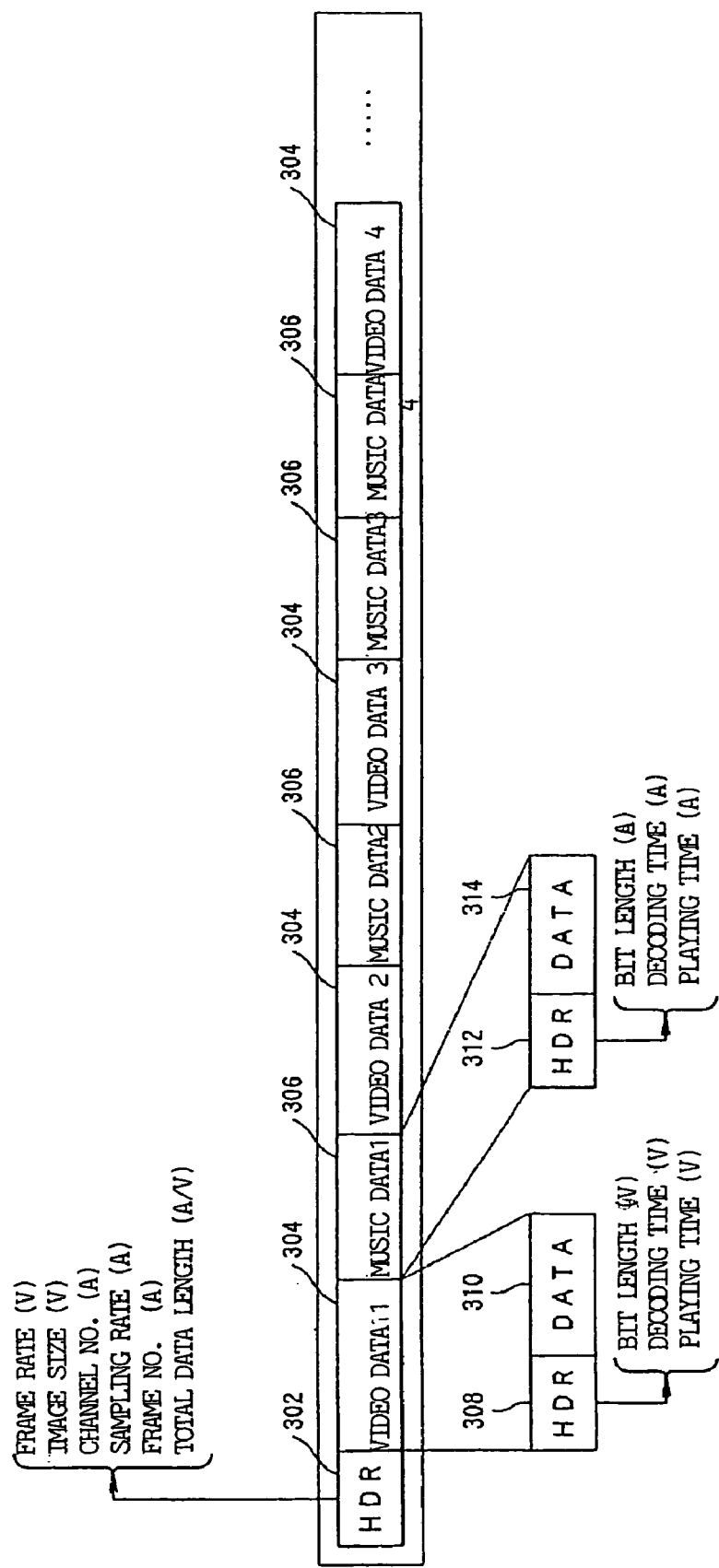

[FIG. 3]
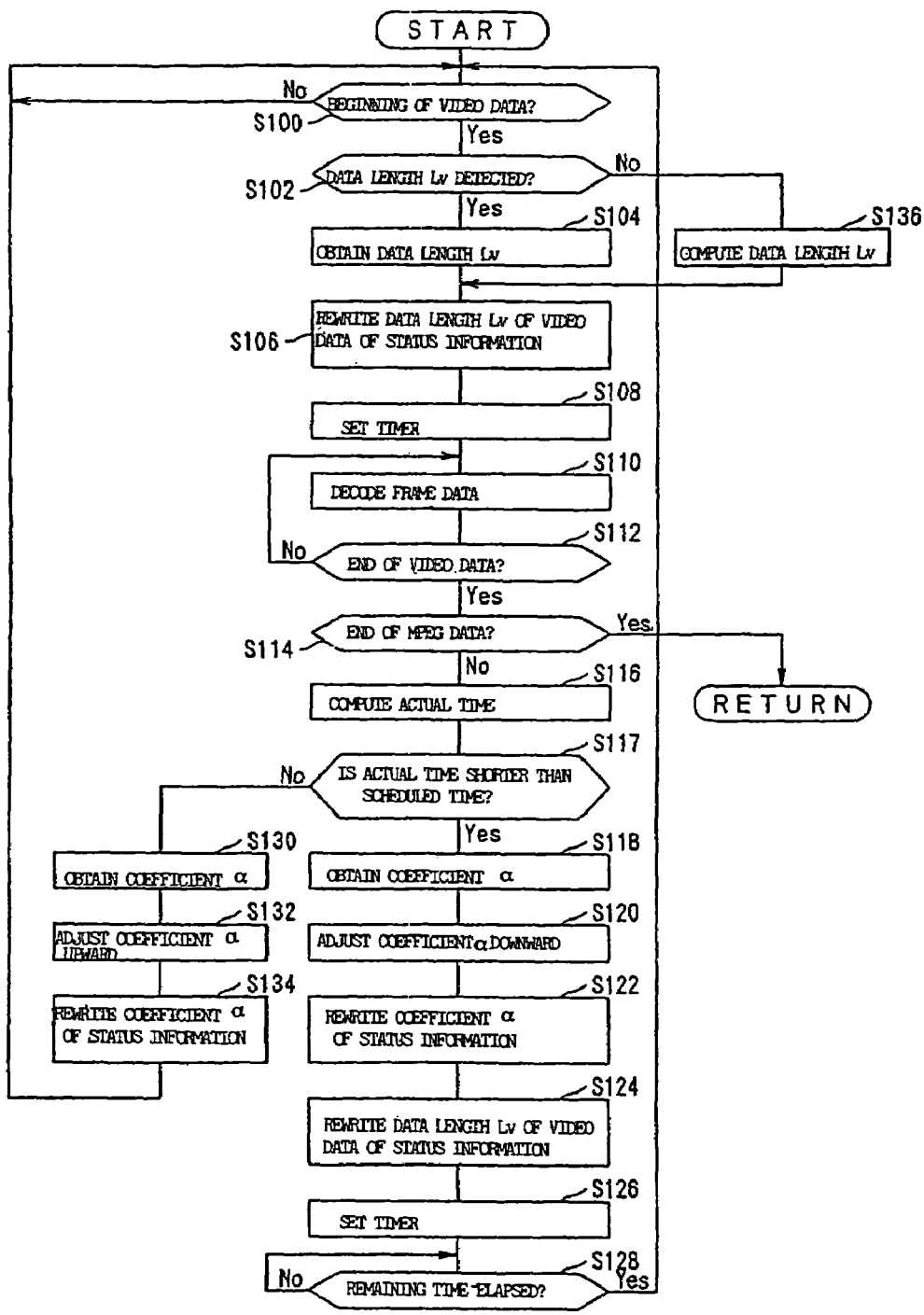

[FIG. 4]
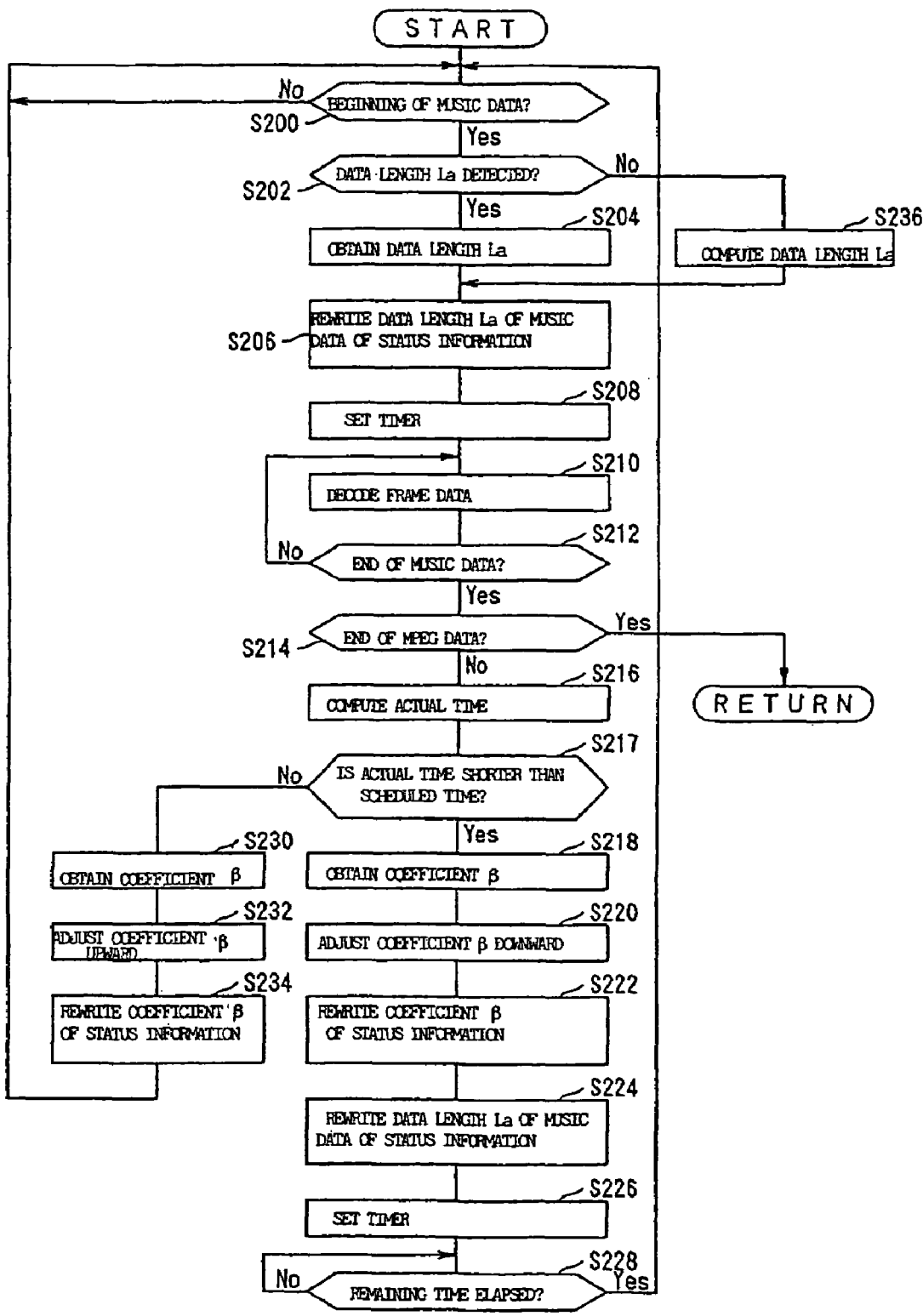

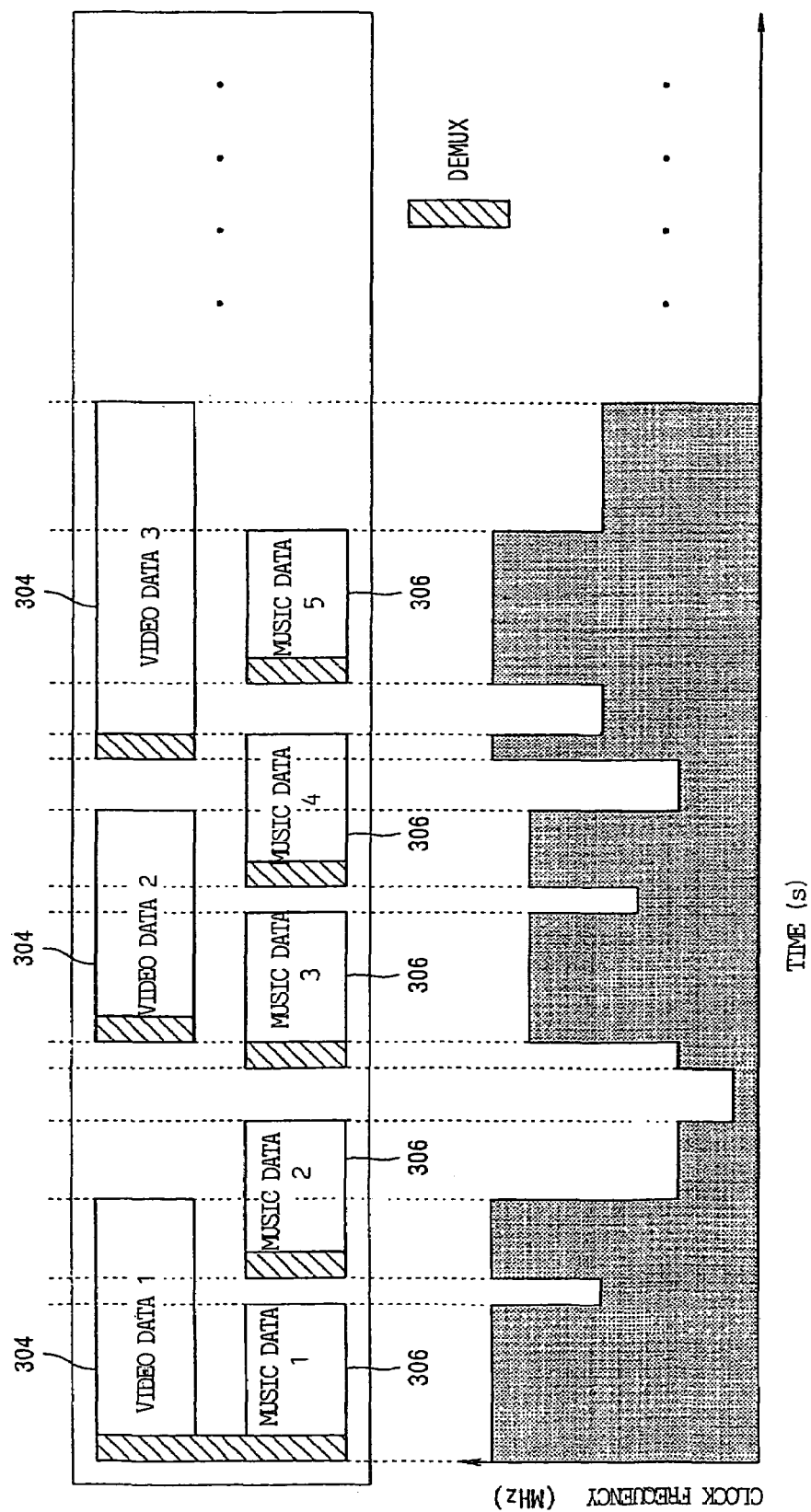
[FIG. 5]

SYSTEM AND METHOD FOR PROVIDING A POWER CONTROL DEVICE FOR A COMPUTING UNIT

BACKGROUND OF THE INVENTION

1. Field of Invention

The present invention relates to devices, decoders, programs, and methods for performing control related to the power consumption of computing units. More particularly, the invention relates to a power control device for a computing unit, a power-saving decoder, a power control program for a computing unit, and a power control method for a computing unit optimal for saving power.

2. Description of Related Art

Computing (arithmetic) operation processors operate at a constant clock frequency irrespective of the contents of MPEG (Moving Picture Experts Group) data when decoding the MPEG data. There are computing (arithmetic) operation processors for saving power. Such computing (arithmetic) operation processors each have an operation load monitoring circuit for monitoring an operation load on the corresponding computing (arithmetic) operation processor. The operation load monitoring circuit adjusts the clock frequency on the basis of the monitoring result.

MPEG data includes video data and music data. Video data includes a predetermined number of frames of frame data, each frame forming one frame of a video image. The arithmetic operation processor decodes the frame data in units of frame data when playing the video image on the basis of the video data. The decoding must be completed within a predetermined frame rate.

Such arithmetic operation processor can operate at a constant clock frequency irrespective of the contents of MPEG data. If decoding of frame data is completed within a frame rate, the arithmetic operation processor operates at a high clock frequency for the remaining time of the frame rate although the arithmetic operation processor does not need to perform operations. As a result, the power consumption of such a device can be large.

SUMMARY OF THE INVENTION

The known arithmetic operation processor for saving power has an operation load monitoring circuit. However, power is consumed by the operation load monitoring circuit. This is unsatisfactory in view of saving power.

In view of the unsolved problems with such known technology, it is an object of the present invention to provide a power control device for a computing unit, a power-saving decoder, a power control program for a computing unit, and a power control method for a computing unit optimal for saving power.

The present invention takes into account that each piece of frame data included in MPEG data places, on a computing unit, an operation load that differs according to the contents of a video image formed of the frame data, and that the operation load is substantially dependent on the data length of the frame data (proportional in a case of a normal frame, whereas inversely proportional in a case of a frame generated by decoding with reference to frame data information prior and subsequent to the target frame data in the time domain). The invention saves power by using the data length of frame data, instead of providing an operation load monitoring circuit. The same thing applies to a case in which the computing unit performs operations not only on MPEG data but also on data encoded by a discrete cosine transformation or data having characteristics similar to the encoded data.

In order to achieve the foregoing objects, a power control device for a computing unit according to the present invention can perform control related to the power consumption of the computing unit for a period during which the computing unit performs an operation on specific operation data. The control related to the power consumption of the computing unit is performed on the basis of the data length of a portion on which an operation is to be performed for the period during which the computing unit performs the operation on the specific operation data. With this arrangement, the control related to the power consumption of the computing unit is performed on the basis of the data length of the portion on which the operation is to be performed for the period during which the computing unit performs the operation on the specific operation data.

The control related to the power consumption of the computing unit can be of any type. For example, the control may adjust a clock to be supplied to the computing unit, may adjust the power to be supplied to the computing unit, or may adjust a frequency or voltage to be supplied to the computing unit. Hereinafter the same applies to a power-saving decoder, a power control program for a computing unit, and a power control method for a computing unit.

A power control device for a computing unit according to the present invention performs control related to the power consumption of the computing unit for a period during which the computing unit performs an operation on specific operation data divided into a plurality of operation units. The power control device can include a power control device to perform the control related to the power consumption of the computing unit. In each operation unit, the power control device performs the control related to the power consumption of the computing unit on the basis of the data length of the operation unit for the period during which the computing unit performs the operation on the data in the operation unit. With this arrangement, in each operation unit, the power control device performs the control related to the power consumption of the computing unit on the basis of the data length of the operation unit for the period during which the computing unit performs the operation on the data in the operation unit.

The power control device can be arranged in various manners as long as it performs the control related to the power consumption of the computing unit. The control related to the power consumption of the computing unit may adjust, for example, a clock to be supplied to the computing unit, the power to be supplied to the computing unit, or a frequency or voltage to be supplied to the computing unit. Hereinafter the same applies to the power-saving decoder.

A power control device for a computing unit according to the present invention, according to a power control device for a computing unit as described above, includes a data length obtaining device for obtaining the data length of the operation unit on the basis of the data in the operation unit. The power control device performs the control related to the power consumption of the computing unit on the basis of the data length obtained by the data length obtaining device for the period during which the computing unit performs the operation on the data in the operation unit. With this arrangement, the data length obtaining device obtains the data length of the operation unit on the basis of the data in the operation unit. The power control device performs the control related to the power consumption of the computing unit on the basis of the obtained data length for the period during which the computing unit performs the operation on the data in the operation unit.

The data length obtaining device can be arranged in various manners as long as it obtains the data length of the operation unit on the basis of the data in the operation unit. For example, when the data in the operation unit has a header indicating the data length thereof, the data length may be obtained from the header. When the data in the operation unit has no header indicating the data length thereof, the data length may be obtained by computing the data length directly from the data in the operation unit. Hereinafter the same applies to the power-saving decoder.

In a power control device for a computing unit according to the present invention, according to a power control device for a computing unit as described above, the specific operation data includes the data, as the data in the operation unit, whose data length is in accordance with an operation load when the computing unit performs the operation. With this arrangement, the specific operation data includes the data, as the data in the operation unit, whose data length is in accordance with the operation load. The power consumption is reduced for the period during which the computing unit performs the operation on the data in the operation unit.

In a power control device for a computing unit according to the present invention, according to a power control device for a computing unit as described above, in each operation unit, the power control device adjusts a frequency to be supplied to the computing unit so as to reduce the power consumption of the computing unit on the basis of the data length of the operation unit for the period during which the computing unit performs the operation on the data in the operation unit. With this arrangement, in each operation unit, the power control device adjusts the frequency to be supplied to the computing unit so as to reduce the power consumption of the computing unit on the basis of the data length of the operation unit for the period during which the computing unit performs the operation on the data in the operation unit.

In a power control device for a computing unit 6 according to the present invention, according to a power control device for a computing unit as described above, the specific operation data can include first specific operation data divided into a plurality of operation units and second specific operation data divided into a plurality of operation units. The power control device adjusts the frequency to be supplied to the computing unit so as to reduce the power consumption of the computing unit on the basis of the data length of the operation unit, on which the operation is to be performed, of the first specific operation data and on the basis of the data length of the operation unit, on which the operation is to be performed, of the second specific operation data for a period during which the computing unit performs operations on the first specific operation data and the second specific operation data in parallel with each other.

With this arrangement, for the period during which the computing unit performs the operations on the first specific operation data and the second specific operation data in parallel with each other, the power control device can adjust the frequency to be supplied to the computing unit so as to reduce the power consumption of the computing unit on the basis of the data length of the operation unit, on which the operation is to be performed, of the first specific operation data and on the basis of the data length of the operation unit, on which the operation is to be performed, of the second specific operation data.

In a power control device for a computing unit according to the present invention, according to a power control device for a computing unit as described above, the power control device determines the frequency to be supplied to the computing unit by multiplying the data length of the operation unit, on which the operation is to be performed, of the first specific operation data by a first coefficient and multiplying the data length of the operation unit, on which the operation is to be performed, of the second specific operation data by a second coefficient and on the basis of the sum of those products of multiplication. With this arrangement, the power control device multiplies the data length of the operation unit, on which the operation is to be performed, of the first specific operation data by the first coefficient, and multiplies the data length of the operation unit, on which the operation is to be performed, of the second specific operation data by the second coefficient. On the basis of the sum of those products of multiplication, the frequency to be supplied to the computing unit is determined.

In a power control device for a computing unit according to the present invention, according to a power control device for a computing unit as described above, when the actual time required by the computing unit to complete the operation on the data in the operation unit is shorter than a scheduled time required by the computing unit to complete the operation on the data, the power control device adjusts one or both of the first coefficient and the second coefficient so as to reduce the frequency to be supplied to the computing unit. With this arrangement, when the actual time is shorter than the scheduled time, the power control device adjusts one or both of the first coefficient and the second coefficient so as to reduce the frequency to be supplied to the computing unit.

In a power control device for a computing unit according to the present invention, according to a power control device for a computing unit as described above, the power control device sets the frequency to be supplied to the computing unit to the permissible minimum frequency of the computing unit for the remaining time, which is obtained by subtracting the actual time from the scheduled time. With this arrangement, the power control device sets the frequency to be supplied to the computing unit to the permissible minimum frequency of the computing unit for the remaining time, which is obtained by subtracting the actual time from the scheduled time.

In a power control device for a computing unit according to the present invention, according to a power control device for a computing unit as described above, when the actual time required by the computing unit to complete the operation on the data in the operation unit is longer than a scheduled time required by the computing unit to complete the operation on the data, the power control device adjusts one or both of the first coefficient and the second coefficient so as to increase the frequency to be supplied to the computing unit. With this arrangement, when the actual time is longer than the scheduled time, the power control device adjusts one or both of the first coefficient and the second coefficient so as to increase the frequency to be supplied to the computing unit.

In a power control device for a computing unit according to the present invention, according to a power control device for a computing unit as described above, the first specific operation data is video data encoded by a discrete cosine transformation, and the second specific operation data is music data encoded by a discrete cosine transformation. With this arrangement, the power control device adjusts the frequency to be supplied to the computing unit so as to reduce the power consumption of the computing unit on the basis of the data length of the operation unit, on which the operation is to be performed, of the video data and the data length of the operation unit, on which the operation is to be performed, of the music data for the period during which the computing unit performs the operations on the video data and the music data in parallel with each other.

In order to achieve the foregoing objects, a power-saving decoder according to the present invention decodes video data or music data encoded by a discrete cosine transformation. A power control device for a computing unit as described above can be applied to the power-saving decoder. With this arrangement, when the video data or the music data encoded by the discrete cosine transformation is decoded, the operation equivalent to that of a power control device for a computing unit as described above is achieved.

In order to achieve the foregoing objects, a power control program for a computing unit according to the present invention performs control related to the power consumption of the computing unit for a period during which the computing unit performs an operation on specific operation data. The program is the computer executable program, in which the control related to the power consumption of the computing unit is performed on the basis of the data length of a portion on which an operation is to be performed for the period during which the computing unit performs the operation on the specific operation data. With this arrangement, when the program is read by a computer, and the computer performs processing in accordance with the read program, the operation equivalent to that of a power control device for a computing unit as described above can be achieved.

In order to achieve the foregoing objects, a power control method for a computing unit as set forth in claim 14 according to the present invention performs control related to the power consumption of the computing unit for a period during which the computing unit performs an operation on specific operation data. The control related to the power consumption of the computing unit is performed on the basis of the data length of a portion on which an operation is to be performed for the period during which the computing unit performs the operation on the specific operation data.

BRIEF DESCRIPTION OF THE DRAWINGS

The invention will be described with reference to the accompanying drawing, wherein like numerals reference like elements, and wherein:

FIG. 1 is an exemplary block diagram showing the configuration of an MPEG decoder 100;

FIG. 2 is a diagram showing the data structure of MPEG data;

FIG. 3 is a flowchart showing an exemplary video data decoding process;

FIG. 4 is a flowchart showing an exemplary music data decoding process; and

FIG. 5 is a graph showing a transition of clock frequency of a CPU 30 when decoding the MPEG data.

DETAILED DESCRIPTION OF PREFERRED EMBODIMENTS

An embodiment of the present invention will be described with reference to the drawings. FIGS. 1 to 5 illustrate a power control device for a computing unit, a power-saving decoder, a power control program for a computing unit, and a power control method for a computing unit according to the present invention.

In this embodiment, the power control device for the computing unit, the power-saving decoder, the power control program for the computing unit, and the power control method for the computing unit according to the present invention are applied to a case, as shown in FIG. 1, in which an MPEG decoder 100 reads (plays back) MPEG data.

With reference to FIG. 1, the configuration of the MPEG decoder 100 will now be described. FIG. 1 is an exemplary block diagram showing the configuration of the MPEG decoder 100.

The MPEG decoder 100 can include, as shown in FIG. 1, a CPU 30 for controlling operations and the overall system on the basis of a control program; a memory 32 having the control program for the CPU 30 stored in a predetermined region; a clock controller 36 for adjusting a clock frequency to be supplied to the CPU 30 on the basis of status information 34 related to setting of the clock frequency; a video buffer 38 for storing video data of MPEG data; a video output unit 40 for playing a video image on the basis of the video data in the video buffer 38; an audio buffer 42 for storing music data of MPEG data; and an audio output unit 44 for playing music on the basis of the music data in the audio buffer 42.

With reference to FIG. 2, the data structure of MPEG data will now be described. FIG. 2 is a diagram showing the data structure of MPEG data.

MPEG data can include, as shown in FIG. 2, a header 302 including header information at the beginning thereof. Subsequent to the header 302, a plurality of pieces of video data 304 and a plurality of pieces of music data 306 are included in a mixed way.

The header 302 includes the following header information: a frame rate indicating the number of pieces of data to be read (played) per unit time in each frame forming the video image; an image size indicating the size of one frame; a channel number of a channel outputting music; a sampling rate of the music data 306; a frame number of the music data 306; and the total data length of the MPEG data. In FIG. 2, a parameter related to the video data 304 is denoted by "(V)", a parameter related to the music data 306 is denoted by "(A)", and a parameter related to the video data 304 and the music data 306 is denoted by "(V/A)".

The video data 304 is formed of a header 308 including header information and frame data 310 forming one frame of a video image. The header 308 includes the following header information: the bit length indicating the data length Lv of the frame data 310; decoding time indicating a scheduled period or scheduled time during which decoding of the frame data 310 must be completed; and playing time indicating a scheduled period or scheduled time during which playing of the video image must be completed on the basis of the frame data 310. The frame data 310 has been encoded by a discrete cosine transformation.

The music data 306 is formed of a header 312 including header information and frame data 314 forming one frame of music. The header 312 includes the following header information: the bit length indicating the data length La of the frame data 314; decoding time indicating a scheduled period or scheduled time during which decoding of the frame data 314 must be completed; and playing time indicating a scheduled period or scheduled time during which playing of the music must be completed on the basis of the frame data 314. The frame data 314 has been encoded by a discrete cosine transformation.

Playing of a video image is scheduled by the header 308 of each piece of the video data 304. Similarly, playing of music is scheduled by the header 312 of each piece of the music data 306. Playing of the video image and music thus needs to be performed independently. The CPU 30 decodes the video data 304 and the music data 306 in parallel with each other. When the video data 304 and the music data 306 are not distinguished from each other, together they are referred to as an access unit.

The clock controller 36 has the status information 34 related to setting of the clock frequency in an internal memory or the like. The clock controller 36 reads the status information 34 from the internal memory or the like and adjusts the clock frequency of the CPU 30 on the basis of the read status information 34. The status information 34 in the internal memory or the like is rewritable by the CPU 30. The clock controller 36 is controlled by rewriting the status information 34 by the CPU 30.

The status information 34 includes a coefficient α used to compute the clock frequency when decoding the video data 304, a coefficient β used to compute the clock frequency when decoding the music data 306, the data length Lv of the frame data 310, and the data length La of the frame data 314.

Using the following equation (1), the clock controller 36 multiplies the data length Lv of the frame data 310 by the coefficient α, multiplies the data length La of the frame data 314 by the coefficient β, and adds those products of multiplication to compute the clock frequency F. The clock controller 36 adjusts the clock frequency of the CPU 30 to the computed clock frequency F. The clock frequency F is computed every predetermined period. In other words, the clock frequency of the CPU 30 is adjusted every predetermined period by rewriting the status information 34 by the CPU 30.

$$F = Lv \times \alpha + La \times \beta \quad (1)$$

The CPU 30 can be formed of a micro processing unit, MPU or the like. When decoding MPEG data, the CPU 30 activates a predetermined program stored in a predetermined region of the memory 32 and, in accordance with the program, performs video data decoding and music data decoding, which are shown in the flowcharts of FIGS. 3 and 4, in a time-shared manner.

First, video data decoding process will now be described with reference to FIG. 3. FIG. 3 is a flowchart showing an exemplary video data decoding process. The video data decoding process decodes the video data 304 of the MPEG data. When executed by the CPU 30, the video data decoding process proceeds to step S100, as shown in FIG. 3.

In step S100, the process determines whether or not a decoding point in the MPEG data is at the beginning of the video data 304. When it is determined that the decoding point is at the beginning of the video data 304 (Yes), the process proceeds to step S102. If determined otherwise (No), the process remains in standby in step S100 until the decoding point is at the beginning of the video data 304.

In step S102, the process determines whether or not the data length Lv of the frame data 310 is detected from the video data 304. If it is determined that the data length Lv of the frame data 310 is detected (Yes), the process proceeds to step S104 and obtains the data length Lv of the frame data 310. The process then proceeds to step S106 and rewrites the data length Lv of the frame data 310 of the status information 34 as the obtained data length Lv and proceeds to step S108.

In step S108, the process sets a timer. The process proceeds to step S110 and decodes the frame data 310. The process then proceeds to step S112 and determines whether or not the decoding point is at the end of the video data 304. If it is determined that the decoding point is at the end of the video data 304 (Yes), the process proceeds to step S114. If determined otherwise (No), the process proceeds to step S110.

In step S114, the process determines whether or not the decoding point is at the end of the MPEG data. If it is determined that the decoding point is not at the end of the MPEG data (No), the process proceeds to step S116 and computes the actual time required to complete decoding of the frame data 310 on the basis of the timer value. The process then proceeds to step S117.

In step S117, the process determines whether or not the actual time is shorter than the scheduled time during which decoding of the frame data 310 must be completed. If it is determined that the actual time is shorter than the scheduled time (Yes), the process proceeds to step S118 and obtains the coefficient α from the status information 34. The process proceeds to step S120 and adjusts the coefficient α downward by subtracting the obtained coefficient α. The process proceeds to step S122, rewrites the coefficient α of the status information 34 as the adjusted coefficient α, and proceeds to step S124. By adjusting the coefficient α downward, the clock controller 36 adjusts the clock frequency of the CPU 30 so as to reduce the clock frequency when similar decoding of the video data 304 is performed the next time.

In step S124, the process rewrites the data length Lv of the frame data 310 of the status information 34 as "0". The process proceeds to step S126 and sets the timer. The process proceeds to step S128 and determines whether or not the remaining time, which is obtained by subtracting the actual time from the scheduled time on the basis of the timer value, has elapsed. If it is determined that the remaining time has elapsed (Yes), the process proceeds to step S100. If determined otherwise (No), the process remains in standby in step S128 until the remaining time elapses.

In contrast, when it is determined in step S1117 that the actual time is longer than the scheduled time (No), the process proceeds to step S130 and obtains the coefficient α from the status information 34. The process proceeds to step S132 and adjusts the coefficient α upward by adding the obtained coefficient α. The process proceeds to step S134, rewrites the coefficient α of the status information 34 as the adjusted coefficient α, and proceeds to step S100. By adjusting the coefficient α upward, the clock controller 36 adjusts the clock frequency of the CPU 30 so as to increase the clock frequency when similar decoding of the video data 304 is performed the next time.

In contrast, when it is determined in step S114 that the decoding point is at the end of the MPEG data (Yes), a series of processing steps is terminated, and the process returns to the former process.

In contrast, when it is determined in step S102 that no data length Lv of the frame data 310 is detected from the video data 304 (No), the process proceeds to step S136 and computes the data length Lv on the basis of the frame data 310, thus obtaining the data length Lv. The process proceeds to step S106.

Next, music data decoding process will now be described with reference to FIG. 4. FIG. 4 is a flowchart showing a music data decoding process.

The music data decoding process decodes the music data 306 of the MPEG data. When executed by the CPU 30, the music data decoding process proceeds to step S200, as shown in FIG. 4.

In step S200, the process determines whether or not a decoding point in the MPEG data is at the beginning of the music data 306. When it is determined that the decoding point is at the beginning of the music data 306 (Yes), the process proceeds to step S202. If determined otherwise (No), the process remains in standby in step S200 until the decoding point is at the beginning of the music data 306.

In step S202, the process determines whether or not the data Length La of the frame data 314 is detected from the music data 306. If it is determined the data Length La of the frame data 314 is detected (Yes), the process proceeds to step S204 and obtains the data Length La of the frame data 314. The process then proceeds to step S206 and rewrites the data Length La of the frame data 314 of the status information 34 as the obtained data Length La and proceeds to step S208.

In step S208, the process sets a timer. The process proceeds to step S210 and decodes the frame data 314. The process then proceeds to step S212 and determines whether or not the decoding point is at the end of the music data 306. If it is determined that the decoding point is at the end of the music data 306 (Yes), the process proceeds to step S214. If determined otherwise (No), the process proceeds to step S210.

In step S214, the process determines whether or not the decoding point is at the end of the MPEG data. If it is determined that the decoding point is not at the end of the MPEG data (No), the process proceeds to step S216 and computes the actual time required to complete decoding of the frame data 314 on the basis of the timer value. The process then proceeds to step S217.

In step S217, the process determines whether or not the actual time is shorter than the scheduled time during which decoding of the frame data 314 must be completed. If it is determined that the actual time is shorter than the scheduled time (Yes), the process proceeds to step S218 and obtains the coefficient $\beta$ from the status information 34. The process proceeds to step S220 and adjusts the coefficient $\beta$ downward by subtracting the obtained coefficient $\beta$. The process proceeds to step S222, rewrites the coefficient $\beta$ of the status information 34 as the adjusted coefficient $\beta$, and proceeds to step S224. By adjusting the coefficient $\beta$ downward, the clock controller 36 adjusts the clock frequency of the CPU 30 so as to reduce the clock frequency when similar decoding of the music data 306 is performed the next time.

In step S224, the process rewrites the data Length La of the frame data 314 of the status information 34 as "0". The process proceeds to step S226 and sets the timer. The process proceeds to step S228 and determines whether or not the remaining time, which is obtained by subtracting the actual time from the scheduled time on the basis of the timer value, has elapsed. If it is determined that the remaining time has elapsed (Yes), the process proceeds to step S200. If determined otherwise (No), the process remains in standby in step S228 until the remaining time elapses.

In contrast, when it is determined in step S217 that the actual time is longer than the scheduled time (No), the process proceeds to step S230 and obtains the coefficient $\beta$ from the status information 34. The process proceeds to step S232 and adjusts the coefficient $\beta$ upward by adding the obtained coefficient $\beta$. The process proceeds to step S234, rewrites the coefficient $\beta$ of the status information 34 as the adjusted coefficient $\beta$, and proceeds to step S200. By adjusting the coefficient $\beta$ upward, the clock controller 36 adjusts the clock frequency of the CPU 30 so as to increase the clock frequency when similar decoding of the music data 306 is performed the next time.

In contrast, when it is determined in step S214 that the decoding point is at the end of the MPEG data (Yes), a series of processing steps is terminated, and the process returns to the former process.

In contrast, when it is determined in step S202 that no data Length La of the frame data 314 is detected from the music data 306 (No), the process proceeds to step S236 and computes the data Length La on the basis of the frame data 314, thus obtaining the data Length La. The process proceeds to step S206.

The operation of this embodiment will now be described.

When MPEG data is supplied together with a decoding request, the CPU 30 starts decoding the MPEG data. The MPEG data is decoded by independently decoding the video data 304 and the music data 306. It is assumed that, prior to decoding the MPEG data, appropriate initial values are assigned to the coefficients $\alpha$ and $\beta$, and the data lengths Lv and La of the status information 34.

When the decoding point is at the beginning of the video data 304, the CPU 30 undergoes steps S100 to S106 and reads the video data 304, obtains the data length Lv of the frame data 310 included in the video data 304, and rewrites the data length Lv of the frame data 310 of the status information 34 as the obtained data length Lv.

When the data length Lv of the frame data 310 of the status information 34 is rewritten, using the above equation (1), the clock controller 36 multiples the data length Lv of the frame data 310 by the coefficient $\alpha$, multiplies the data length La of the frame data 314 by the coefficient $\beta$, and adds those products of multiplication. Accordingly, the clock frequency F is computed, and the clock frequency of the CPU 30 is adjusted to the computed clock frequency F. The larger the data length Lv, the larger the operation load when decoding the frame data 310. Thus, the clock frequency of the CPU 30 is set to a high frequency in accordance with the operation load. In contrast, the smaller the data length Lv, the smaller the operation load when decoding the frame data 310. Thus, the clock frequency of the CPU 30 is set to a low frequency so that the power consumption can be reduced.

The CPU 30 operates at the clock frequency set in this manner and repeats steps S108 to step S112 to set the timer and decode the frame data 310. When decoding is completed, through steps S116 and S117, the process computes the actual time required to complete decoding of the frame data 310 on the basis of the timer value. The scheduled time during which decoding of the frame data 310 must be completed is compared with the actual time. As a result, when it is determined that the actual time is shorter than the scheduled time, through steps S118 to S122, the process obtains the coefficient $\alpha$ from the status information 34, adjusts the coefficient $\alpha$ downward by subtracting the obtained coefficient $\alpha$, and rewrites the coefficient cc of the status information 34 as the adjusted coefficient $\alpha$.

When the coefficient $\alpha$ is adjusted downward, as a result, the clock controller 36 adjusts the clock frequency of the CPU 30 so as to reduce the clock frequency when similar decoding of the video data 304 is performed the next time.

The CPU 30 undergoes step S124 and rewrites the data length Lv of the frame data 310 of the status information 34 as "0", and repeats step S128 to maintain the state in which the data length Lv is "0" for the remaining time, which is obtained by subtracting the actual time from the scheduled time.

When the data length Lv of the frame data 310 of the status information 34 is rewritten as "0", the clock controller 36 sets the clock frequency of the CPU 30 to the permissible minimum frequency for the remaining time, which is obtained by subtracting the actual time from the scheduled time. The permissible minimum frequency is computed from the remaining portion, other than the portion related to the video data 304, which is set to "0", of the clock frequency F in the above equation (1).

In contrast, when it is determined as a result of comparison between the scheduled time and the actual time that the actual time is longer than the scheduled time, the CPU 30 undergoes steps S130 to S134 and obtains the coefficient α from the status information 34, adjusts the coefficient α upward by adding the obtained coefficient α, and rewrites the coefficient α of the status information 34 as the adjusted coefficient α.

When the coefficient α is adjusted upward, as a result, the clock controller 36 adjusts the clock frequency of the CPU 30 so as to increase the clock frequency when similar decoding of the video data 304 is performed the next time.

When the decoding point is at the beginning of the music data 306, the CPU 30 undergoes steps S200 to S206 and reads the music data 306, obtains the data length La of the frame data 314 included in the music data 306, and rewrites the data length La of the frame data 314 of the status information 34 as the obtained data length La.

When the data length La of the frame data 314 of the status information 34 is rewritten, using the above equation (1), the clock controller 36 multiples the data length Lv of the frame data 310 by the coefficient α, multiplies the data length La of the frame data 314 by the coefficient β, and adds those products of multiplication. Accordingly, the clock frequency F is computed, and the clock frequency of the CPU 30 is adjusted to the computed clock frequency F. The larger the data length La, the larger the operation load when decoding the frame data 314. Thus, the clock frequency of the CPU 30 is set to a high frequency in accordance with the operation load. In contrast, the smaller the data length La, the smaller the operation load when decoding the frame data 314. Thus, the clock frequency of the CPU 30 is set to a low frequency so that the power consumption can be reduced.

The CPU 30 operates at the clock frequency set in this manner and repeats steps S208 to step S212 to set the timer and decode the frame data 314. When decoding is completed, through steps S216 and S217, the process computes the actual time required to complete decoding of the frame data 314 on the basis of the timer value. The scheduled time during which decoding of the frame data 314 must be completed is compared with the actual time. As a result, when it is determined that the actual time is shorter than the scheduled time, through steps S218 to S222, the process obtains the coefficient β from the status information 34, adjusts the coefficient β downward by subtracting the obtained coefficient β, and rewrites the coefficient β of the status information 34 as the adjusted coefficient β.

When the coefficient β is adjusted downward, as a result, the clock controller 36 adjusts the clock frequency of the CPU 30 so as to reduce the clock frequency when similar decoding of the music data 306 is performed the next time.

The CPU 30 undergoes step S224 and rewrites the data length La of the frame data 314 of the status information 34 as "0", and repeats step S228 to maintain the state in which the data length La is "0" for the remaining time, which is obtained by subtracting the actual time from the scheduled time.

When the data length La of the frame data 314 of the status information 34 is rewritten as "0", the clock controller 36 sets the clock frequency of the CPU 30 to the permissible minimum frequency for the remaining time, which is obtained by subtracting the actual time from the scheduled time. The permissible minimum frequency is computed from the remaining portion, other than the portion related to the music data 306, which is set to "0", of the clock frequency F in the above equation (1).

In contrast, when it is determined as a result of comparison between the scheduled time and the actual time that the actual time is longer than the scheduled time, the CPU 30 undergoes steps S230 to S234 and obtains the coefficient β from the status information 34, adjusts the coefficient β upward by adding the obtained coefficient β, and rewrites the coefficient β of the status information 34 as the adjusted coefficient β.

When the coefficient β is adjusted upward, as a result, the clock controller 36 adjusts the clock frequency of the CPU 30 so as to increase the clock frequency when similar decoding of the music data 306 is performed the next time.

As discussed above, as a result of the fact that the video data 304 and the music data 306 are decoded independently, as shown in FIG. 5, the clock frequency of the CPU 30 is set to a higher frequency in accordance with the operation load since the larger the data length Lv or La, the larger the operation load when decoding the frame data 310 or 314. In contrast, the smaller the data length Lv or La, the smaller the operation load when decoding the frame data 310 or 314. Thus, the clock frequency of the CPU 30 is set to a low frequency so that the power consumption can be reduced. FIG. 5 is a graph showing a transition of the clock frequency of the CPU 30 when decoding the MPEG data.

Accordingly in this embodiment, in each operation unit included in MPEG data, the clock frequency of the CPU 30 is adjusted so as to reduce the power consumption of the CPU 30 on the basis of the data length Lv or La of the operation unit for a period during which the CPU 30 performs an operation on the data in the operation unit.

Accordingly, the clock frequency of the CPU 30 is adjusted so as to reduce the power consumption of the CPU 30 on the basis of the data length Lv or La of the operation unit. The power consumption of the CPU 30 is thus adjusted relatively appropriately in accordance with the operation load. Since no operation load monitoring circuit needs to be provided, the power consumption is reduced by the amount of the power that should have been consumed by an operation load monitoring circuit. The power consumption can be efficiently reduced compared with the power that had been consumed previously.

In this embodiment, the clock frequency of the CPU 30 is adjusted so as to reduce the power consumption of the CPU 30 on the basis of the data length Lv of the operation unit, on which an operation is to be performed, of the video data 304 and the data length La of the operation unit, on which an operation is to be performed, of the music data 306 for a period during which the CPU 30 performs operations on the video data 304 and the music data 306 in parallel with each other.

Accordingly, the power consumption of the CPU 30 is relatively appropriately adjusted in accordance with the operation load when the CPU 30 performs operations on the video data 304 and the music data 306 in parallel with each other.

In this embodiment, the data length Lv of the operation unit, on which an operation is to be performed, of the video data 304 is multiplied by the coefficient α, and the data length La of the operation unit, on which an operation is to be performed, of the music data 306 is multiplied by the coefficient β. On the basis of the sum of those products of multiplication, the clock frequency F of the CPU 30 is determined.

Accordingly, the coefficient α and the coefficient β are adjusted. By adjusting the coefficient α and the coefficient β in accordance with the performance of the CPU 30, the power consumption is efficiently reduced in accordance with the performance of the CPU 30.

In this embodiment, when the actual time required to complete decoding of the frame data 310 and/or 314 is shorter than the scheduled time during which decoding of the frame data 310 and/or 314 must be completed, one or both of the coefficients α and the coefficient β are adjusted so as to reduce the clock frequency of the CPU 30. Accordingly, when the actual time is shorter than the scheduled time, the coefficient α and/or the coefficient β is adjusted so as to reduce the clock frequency of the CPU 30. The coefficient α and the coefficient β are thus adjusted to relatively appropriate values in accordance with the performance of the CPU 30. Therefore, the power consumption is efficiently reduced in accordance with the performance of the CPU 30.

In this embodiment, when the actual time is shorter than the scheduled time, the clock frequency of the CPU 30 is set to the permissible minimum frequency of the CPU 30 for the remaining time, which is obtained by subtracting the actual time from the scheduled time. Accordingly, the power consumption is reduced for the remaining time, which is obtained by subtracting the actual time from the scheduled time.

In this embodiment, when the actual time required to complete decoding of the frame data 310 and/or 314 is longer the scheduled time during which decoding of the frame data 310 and/or 314 must be completed, one or both of the coefficient α and the coefficient β are adjusted so as to increase the clock frequency of the CPU 30. Accordingly, when the actual time is longer than the scheduled time, the coefficient α and/or the coefficient β is adjusted so as to increase the clock frequency of the CPU 30. The coefficient α and the coefficient β are thus adjusted to relatively appropriate values in accordance with the performance of the CPU 30. Therefore, the power consumption is efficiently reduced in accordance with the performance of the CPU 30.

In the foregoing embodiment, the clock frequency of the CPU 30 is controlled so as to reduce the power consumption of the CPU 30. However, it should be understood that the present invention is not limited to this embodiment. The power or voltage supplied to the CPU 30 may be controlled so as to reduce the power consumption of the CPU 30. Alternatively, the presence of a clock, power, or voltage supplied to the CPU 30 is controlled so as to reduce the power consumption of the CPU 30.

In the foregoing embodiment, the data lengths Lv and La are included in advance in the MPEG data. The data lengths Lv and La are obtained from the MPEG data. The data length Lv is multiplied by the coefficient α, and the data length La is multiplied by the coefficient β. The products of multiplication are added to compute the clock frequency F. Alternatively, the product of the data length Lv and the coefficient α and the product of the data length La and the coefficient β are included in advance in the MPEG data. The products are obtained from the MPEG data. The products are added to compute the clock frequency F.

In the foregoing embodiment, when performing the processes shown in the flowcharts of FIGS. 3 and 4, a case has been described in which the control program stored beforehand in the memory 32 is executed. However, it should be understood that the present invention is not limited to this case. Alternatively, a program indicating the processing steps is read from a storage medium having stored therein the program into the memory 32, and the program is thus executed.

The term storage medium includes a semiconductor storage medium, such as a RAM or a ROM, a magnetic storage medium such as an FD or an HD, an optical mark reading storage medium such as a CD, a CDV, an LD, or a DVD, and a magnetic storage/optical mark reading storage medium such as an MO. The storage medium includes any type of storage medium as long as it is readable by a computer irrespective of the reading method such as the electrical, magnetic, or optical reading method.

Although the power control device for the computing unit, the power-saving decoder, the power control program for the computing unit, and the power control method for the computing unit according to the present invention are, as shown in FIG. 1, applied to a case in which the MPEG decoder 100 reads the MPEG data in the foregoing embodiment, the present invention is not limited to this case and is applicable to other cases without departing from the scope of the present invention. For example, the present invention is applicable not only to a case in which the MPEG data is to be decoded but also to a case in which a computing unit such as a CPU or a DSP (Digital Signal Processor) performs an operation on data encoded by a discrete cosine transformation or on data having similar characteristics.

As described above, according to a power control device for a computing unit according to the present invention, control related to the power consumption of the computing unit is performed on the basis of the data length. When specific operation data includes data whose data length is in accordance with an operation load, the power consumption of the computing unit is relatively appropriately adjusted in accordance with the operation load. Since no operation load monitoring circuit needs to be provided, the power consumption is reduced by the amount of the power that should have been consumed by an operation load monitoring circuit. The power consumption can be efficiently reduced compared with the power that had been consumed previously.

According to a power control device for a computing unit according to the present invention, control related to the power consumption of the computing unit is performed on the basis of the data length of the operation unit. When specific operation data includes, as data in the operation unit, data whose data length is in accordance with an operation load, the power consumption of the computing unit is relatively appropriately adjusted in accordance with the operation load. Since no operation load monitoring circuit needs to be provided, the power consumption is reduced by the amount of the power that should have been consumed by an operation load monitoring circuit. The power consumption can be efficiently reduced compared with the power that had been consumed previously.

According to a power control device for a computing unit according to the present invention, the specific operation data includes, as data in the operation unit, data whose data length is in accordance with the operation load, and the control related to the power consumption of the computing unit is performed on the basis of the data length of the operation unit. The power consumption is further efficiently reduced.

According to a power control device for a computing unit according to the present invention, a frequency to be supplied to the computing unit is adjusted so as to reduce the power consumption of the computing unit on the basis of the data length of the operation unit. The power consumption is further efficiently reduced.

According to a power control device for a computing unit according to the present invention, when the computing unit performs operations on first specific operation data and second specific operation data in parallel with each other, the power consumption of the computing unit is relatively appropriately adjusted in accordance with the operation load.

According to a power control device for a computing unit according to the present invention, a first coefficient and a second coefficient can be adjusted. By adjusting the first coefficient and the second coefficient in accordance with the performance of the computing unit, the power consumption is efficiently reduced in accordance with the performance of the computing unit.

According to a power control device for a computing unit according to the present invention, when the actual time is shorter than the scheduled time, the first coefficient or the second coefficient is adjusted so as to reduce the frequency to be supplied to the computing unit. The first coefficient and the second coefficient are thus adjusted to relatively appropriate values in accordance with the performance of the computing unit. The power consumption is further efficiently reduced in accordance with the performance of the computing unit.

According to a power control device for a computing unit according to the present invention, the power consumption is reduced for the remaining time, which is obtained by subtracting the actual time from the scheduled time.

According to a power control device for a computing unit according to the present invention, when the actual time is longer than the scheduled time, the first coefficient or the second coefficient is adjusted so as to increase the frequency to be supplied to the computing unit. The first coefficient and the second coefficient are thus adjusted to relatively appropriate values in accordance with the performance of the computing unit. The power consumption is further efficiently reduced in accordance with the performance of the computing unit.

According to a power control device for a computing unit according to the present invention, when the computing unit performs operations on video data and music data in parallel with each other, the power consumption of the computing unit is relatively appropriately adjusted in accordance with the operation load.

According to a power-saving decoder according to the present invention, advantages equivalent to those achieved by a power control device for a computing unit as described above can be achieved.

According to a power control program for a computing unit according to the present invention, advantages equivalent to those achieved by a power control device for a computing unit as described above can be achieved.

According to a power control method for a computing unit according to the present invention, advantages equivalent to those achieved by a power control device for a computing unit as described above can be achieved.

What is claimed is:

1. A computer, comprising:
   a processor that processes specific operation data, the specific operation data including a plurality of portion data, the processor processing the plurality of portion data one by one;
   a data length detector that obtains a data length of a portion of the specific operation data; and
   a power controller that controls a power consumption of the processor on the basis of the data length obtained by the data length detector, the power control being performed while the processor processes the specific operation data,
   the power controller controlling a clock frequency of the processor to reduce the power consumption of the processor, the power controller determining the clock frequency on the basis of a sum of (1) a first product of a first coefficient and the data length of a portion data of the first specific data and (2) a second product of a second coefficient and the data length of a portion data of the second specific data.

2. The computer according to claim 1, the specific operation data includes first specific operation data and second specific operation data, the first specific data including a plurality of portion data, and the second specific data including a plurality of portion data; and
   when the processor processes in parallel the first specific operation data and the second specific operation data, the power controller controls a power consumption of the processor on the basis of both the data length of the portion data of the first specific data and the data length of the portion data of the second specific data.

3. The computer according to claim 2, the first specific operation data including video data encoded by a discrete cosine transformation and the second specific operation data includes music data encoded by a discrete cosine transformation.

4. The computer according to claim 1, the power controller determining the clock frequency prior to the processing of the portion data by the processor.

5. The computer according to claim 1, the power controller adjusting at least one of the first coefficient and the second coefficient so as to reduce the clock frequency, in a case that an actual time required by the processor to complete the processing on the portion data is shorter than a scheduled time required by the processor to complete the processing.

6. The computer according to claim 5, the power controller calculating a remaining time by subtracting an actual time from the scheduled time, and
   the power controller determining as the clock frequency a frequency corresponding to the calculated remaining time.

7. A computer readable storage medium storing a program product that when read by a computer causes the computer to execute:
   processing, by a processor, specific operation data;
   obtaining, by a data length detector, a data length of a part of the specific operation data, the part to be processed by the processor; and
   controlling, by a power controller, a power consumption of the processor based on the data length obtained by the data length detector, the power control being performed during the processing of the specific operation data by the processor,
   the controlling including controlling a clock frequency of the processor by the power controller to reduce the power consumption of the processor, the power controller determining the clock frequency on the basis of a sum of (1) a first product of a first coefficient and the data length of a portion data of the first specific data and (2) a second product of a second coefficient and the data length of a portion data of the second specific data.

8. A power control method for a computer, the method comprising:

processing, by a processor, specific operation data;

obtaining, by a data length detector, a data length of a part of the specific operation data, the part to be processed by the processor; and controlling, by a power controller, a power consumption of the processor based on the data length obtained by the data length detector, the power control being performed during the processing of the specific operation data by the processor, the controlling including controlling a clock frequency of the processor by the power controller to reduce the power consumption of the processor, the power controller determining the clock frequency on the basis of a sum of (1) a first product of a first coefficient and the data length of a portion data of the first specific data and (2) a second product of a second coefficient and the data length of a portion data of the second specific data.

* * * * *